(12) United States Patent
Shindo

(10) Patent No.: US 7,031,514 B1
(45) Date of Patent: Apr. 18, 2006

(54) IMAGE COMPRESSION METHOD

(75) Inventor: Jiro Shindo, Kyoto (JP)

(73) Assignee: Celartem Technology Inc., Kyoto (JP)

( * ) Notice: Subject to any disclaimer, the term of this patent is extended or adjusted under 35 U.S.C. 154(b) by 731 days.

(21) Appl. No.: 10/069,227

(22) PCT Filed: Jul. 5, 2000

(86) PCT No.: PCT/JP00/04472

§ 371 (c)(1),
(2), (4) Date: Sep. 16, 2002

(87) PCT Pub. No.: WO01/17229

PCT Pub. Date: Mar. 8, 2001

(30) Foreign Application Priority Data

Aug. 27, 1999 (JP) ................................. 11-283296

(51) Int. Cl.
G06K 9/00 (2006.01)
G06K 9/46 (2006.01)
(52) U.S. Cl. ...................................... 382/164; 382/240
(58) Field of Classification Search ................ 382/162, 382/164, 165, 173, 232, 233, 240, 246, 247, 382/251, 253, 278, 284; 375/240.03, 240.12, 375/240.16, 240.22, 240.24, 240.25; 348/391.1, 348/631; 358/515, 520
See application file for complete search history.

(56) References Cited

U.S. PATENT DOCUMENTS 4,205,341 A * 5/1980 Mitsuya et al. ........ 375/240.24
4,467,346 A * 8/1984 Mori ..................... 348/391.1
5,072,290 A * 12/1991 Yamagami et al. ..... 375/240.25

(Continued)

FOREIGN PATENT DOCUMENTS

JP 4-579 1/1992

(Continued)

OTHER PUBLICATIONS

Abstract of JP 10-32719, Feb. 3, 1998, esp@cenet.com database.

(Continued)

*Primary Examiner*—Andrew W. Johns
*Assistant Examiner*—Amir Alavi
(74) *Attorney, Agent, or Firm*—Seed IP Law Group PLLC

(57) ABSTRACT

Bitmap digital image data having one or more color channels is divided into image sizes corresponding to an optimum processing unit set according to computer's processing capability and requested image quality. Each unit image data is further divided according to the respective color channels in order to generate multiple minimum processing units of image data. After respective horizontal rows of the minimum processing unit of image data are 2D-vectored based on the horizontal positions x and luminance levels y of the respective pixels therein, quantized according to changes in luminance levels using line elements connecting the starting points and end points of the respective rows as reference vectors, and applied with shaping processing, the respective vertical rows are 2D-vectored based on the horizontal positions x and luminance levels y in the same manner and quantized according to the changes in luminance levels using line elements connecting the starting point and the end point of the respective rows as reference vectors in order to convert the image data into compressed image data with a matrix structure based on the significance of the luminance information contained in the respective pixels. After said minimum units of compressed image data are further compressed mathematically, the color channels are integrated in order to generate optimum processing units of compressed image data; and they are further integrated in order to generate compressed image data for the entire original image.

6 Claims, 18 Drawing Sheets

U.S. PATENT DOCUMENTS

| | | | |
|---|---|---|---|
| 5,828,784 A * | 10/1998 | Miyashita et al. | 382/232 |
| 6,625,214 B1 * | 9/2003 | Umehara et al. | 375/240.12 |
| 6,868,190 B1 * | 3/2005 | Morton | 382/278 |
| 6,947,098 B1 * | 9/2005 | Hentschel et al. | 348/631 |
| 2003/0081852 A1 * | 5/2003 | Pohjola | 382/253 |

FOREIGN PATENT DOCUMENTS

| | | |
|---|---|---|
| JP | 8-194816 | 7/1996 |
| JP | 9-298747 | 11/1997 |
| JP | 10-32719 | 2/1998 |

OTHER PUBLICATIONS

Abstract of JP 9-298747, Nov. 18, 1997, esp@cenet.com database.

Abstract of JP 8-194816, Jul. 30, 1996, esp@cenet.com database.

Abstract of JP 4-579, Jan. 6, 1992, esp@cenet.com database.

* cited by examiner

*Fig. 15*

IMAGE COMPRESSION METHOD

BACKGROUND OF THE TECHNOLOGY

1. Field of the Invention

The present invention pertains to an image compression method for compressing digital image data, such as a full-color image with additive primary colors (RGB) or subtractive primary colors (CMY) or a monochrome image with 256 levels (gray scale).

2. Description of the Related Art

In general, digital image data comprising luminance information for the respective color elements, that is, respective color channels (color model), in a color model, such as the RGB system or the CMY system, is utilized for computer processing of a color image. Said digital image data is represented by 1 byte (8 bits) of information for expressing the luminance levels of the respective colors (RGB) of 1 pixel using values in 256 steps (256 gradations), that is, 0 through 255, so that 1 pixel has 3 bytes of information. Thus, a superfine color image contains an enormous amount of data, which means that not only hardware resources, such as a large-capacity memory, a hard disk drive, a high-speed CPU, and communications technology capable of realizing high-speed data transfer, but also a data compression technique are required in order to process said image data using a computer.

Although a variety of data compression methods have been suggested, some of these use techniques that reduce the quality when a compressed image is decompressed. For example, based on the fact that image data does not necessarily use every color, there is a method in which appropriate, preset color subtraction is applied in order to reduce the file size without destroying the original image. With this kind of compression method involving color subtraction, because similar color values are integrated during the compression process, the continuity of the color scale is lost, and fine lines, in particular, tend to become blurred. In addition, there is a known compression method in which luminance information is converted into color difference information when the color information is stored. However, the amount of significant information contained in color difference information is approximately ¼ or less that in luminance information, which means that hues tend to be reproduced incorrectly.

Japanese Kokai Patent Application No. Hei 10[1998]-32719 discloses an image compression method and a device in which color image data comprising luminance information for the 3 primary colors is converted into color model data comprising 1 luminance information and 2 color difference information which is then compressed using a method capable of high quality reproduction in order to achieve a sufficiently high compression rate and reproduced image quality. 3D vector quantization is adopted for said compression processing technique for high-quality reproduction; wherein, a group of horizontal pixel groups having luminance levels which can be assumed to change successively within a fixed allowable error range on an XZ plane, is expressed using a single vector unit, where distribution of the luminance levels of respective pixels on the XY image plane is expressed in terms of magnitude in the direction of the Z axis, and a group of vertical pixel groups having luminance levels which can be assumed to change successively within a fixed allowable error range on the XZ plane is expressed using a single vector unit in the same manner. When the image compression method according to the aforementioned Kokai patent application is utilized, while the compression rate can be improved significantly over the prior art, because conversion into color information is applied before compression, the reproduced picture quality tends to be degraded when the image data is expanded by decompression.

Thus, the purpose of the present invention is to present an image compression method by which successive changes in hue can be reproduced accurately, fine lines can also be reproduced clearly, and a high-quality image good enough to serve as an image manuscript for printing can be reproduced while also realizing a superior compression effect with superfine digital image data.

BRIEF SUMMARY OF THE INVENTION

With the present invention, image compression is performed in which respective horizontal rows of bitmap digital image data with a single or multiple color channels are 2D-vectored according to the positions of the respective pixels in the horizontal direction and their luminance levels. The pixels are quantized according to the change in the luminance levels with reference to the line elements connecting the starting points and the end points of the respective rows.

Respective vertical rows of the horizontally vectored and quantized image data are 2D-vectored according to the positions of the respective pixels and their luminance levels according to the degrees of change in the luminance levels with reference to the line elements connecting the starting points and the end points of the respective rows.

The data is converted into compressed image data in matrix form based on the significance levels of the luminance information of the respective pixels.

Because the luminance information for each pixel contained in the image data is 2D-vectored and quantized according to the change in the luminance levels in order to hierarchize and reconstruct the data based on the significance levels in the information for each pixel, luminance information for pixels with no substantial significance are absorbed into the same vector. Therefore, the amount of original image data can be reduced without substantially losing the information contained in said data, and the most efficient data structure for compressing superfine image data, in particular, can be created.

In one application example, original bitmap digital image data are divided into image data units of a prescribed size. Horizontal vectoring and quantization and subsequent vertical vectoring and quantization are applied to the respective divided image data units in order to convert them into compressed image data units in matrix form and the respective compressed image data units are integrated at the end. Accordingly, even when the original image contains a relatively large amount of data, it can be processed efficiently in accordance with the processing capability of the computer and the required image quality.

In another application example, after the original bitmap digital image data are divided into respective color channels, and the divided image data on the respective color channels are converted into respective compressed image data in matrix form, they are integrated into a single compressed image data unit. Accordingly, because the processing unit of image data according to the RGB system or the CMY system, for example, can be reduced to ⅓ its prior size, it can be processed efficiently.

In another embodiment, when the original bitmap digital image data is divided into image data units of a prescribed size, after said respective image data units are further divided for the respective color channels, and the divided image data units for the respective color channels are converted into respective compressed image data units in matrix form, they are integrated into one compressed image data unit, thus, even more efficient compression processing can be realized.

Furthermore, with the present invention, the compressed image data in matrix form generated in this manner can be further compressed mathematically. As a result, image data can be compressed at an even higher level without any loss.

In one application example, the horizontal or vertical quantization process involves a process in which line elements connecting the starting points and the end points of respective columns or respective rows are used as reference vectors for calculating positive and/or negative maximum deviation points in such sections. Line elements connecting each two neighboring points at the starting points, the end points, and the maximum deviation points are used as new reference vectors for calculating new positive and/or negative maximum deviation points in the sections in order to calculate said maximum deviation points. This can be repeated until the deviations of the respective maximum points with respect to the reference vectors lose their significance as desired image data, and respective pixels are divided according to the degree of deviation at the respective maximum deviation points in order to generate multiple hierarchical data containing different numbers of bits.

For example, when the original bitmap digital image data is 8-bit data, it is preferable that the multiple hierarchical data are constructed in four sets, as first through fourth hierarchical data comprising 8 bits, 6 bits, 4 bits, and 1 bit, respectively.

BRIEF DESCRIPTION OF THE SEVERAL VIEWS OF THE FIGURES

FIG. 15 is a schematic diagram showing the distribution of the first through the fourth hierarchical data of the image data vectored in the horizontal and vertical directions.

DETAILED DESCRIPTION OF THE INVENTION

An image compression method of the present invention will be explained in detail below in accordance with one or more preferred application examples with reference to the attached figures.

Figure 1:
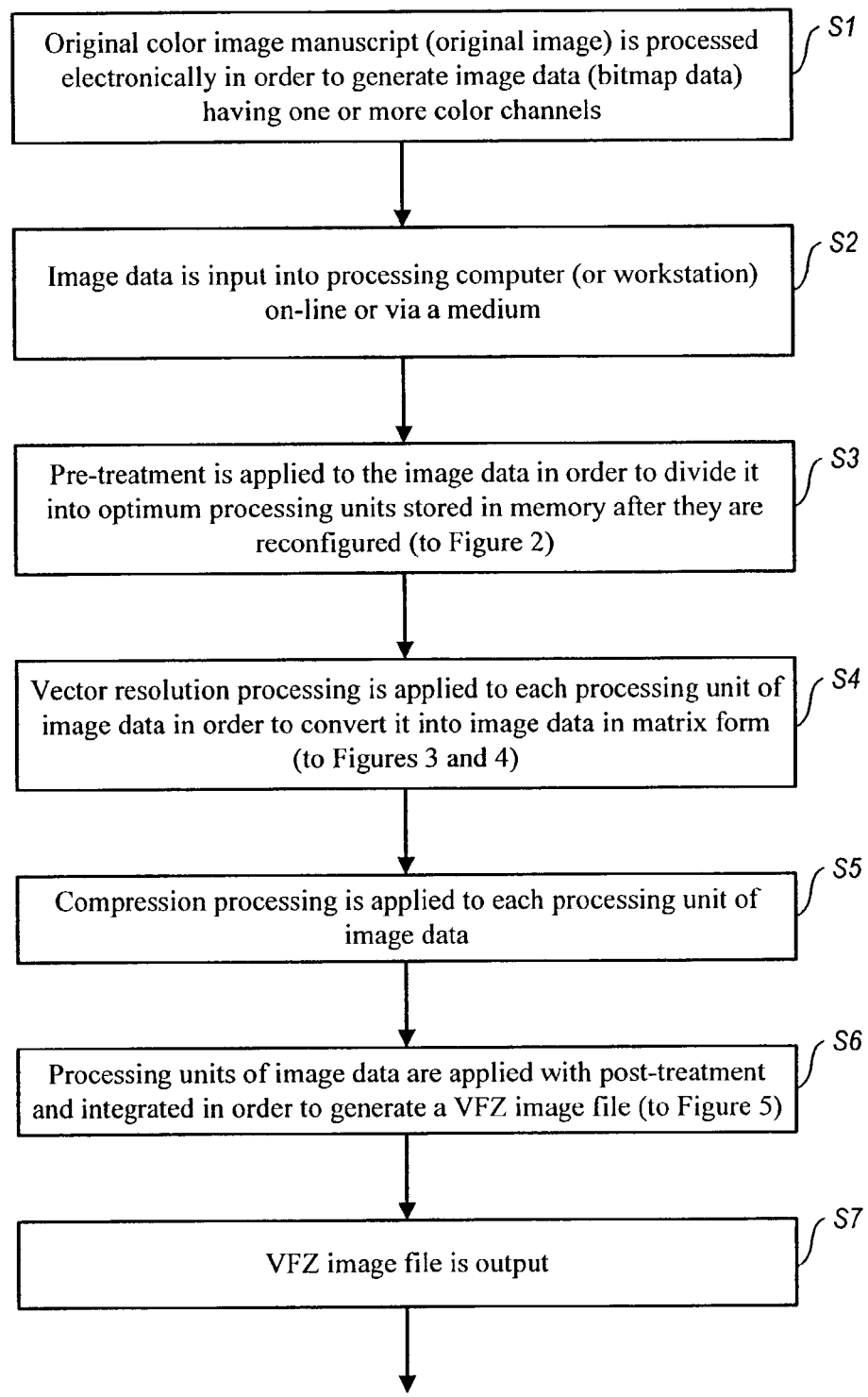
FIG. 1 is a flowchart showing the outline of a preferred application example of the image compression method in accordance with the present invention.

FIG. 1 is a flowchart showing the outline of the process in which a compressed image file is generated from a full-color image manuscript, that is, the original image, using the method in accordance with an embodiment of the present invention. First, the desired image manuscript is processed electronically in order to generate image data as bitmap data with multiple color channels as in an RGB system or CMY system or monochromatic channel expressed only by means of a gray scale (step S1). Usually, this type of image data is generated at arbitrary input resolutions and luminance levels based on prescribed amounts of information, for example, 12 bits, 8 bits (1 byte), and 1 bit (binary), using a variety of known means, such as an image scanner and a digital camera. The image data is input on-line to a processing computer or a workstation via a network utilizing a storage medium, such as a CD-R, an MO disk, and a DVD, and Ethernet (step S2) in order to carry out the image compression process of the present invention. The data can be distributed with the proper security protocols as explained in published PCT application numbers PCT/JP00/05801 and PCT/JP00/05802, both of which are incorporated herein by reference.

Figure 2:
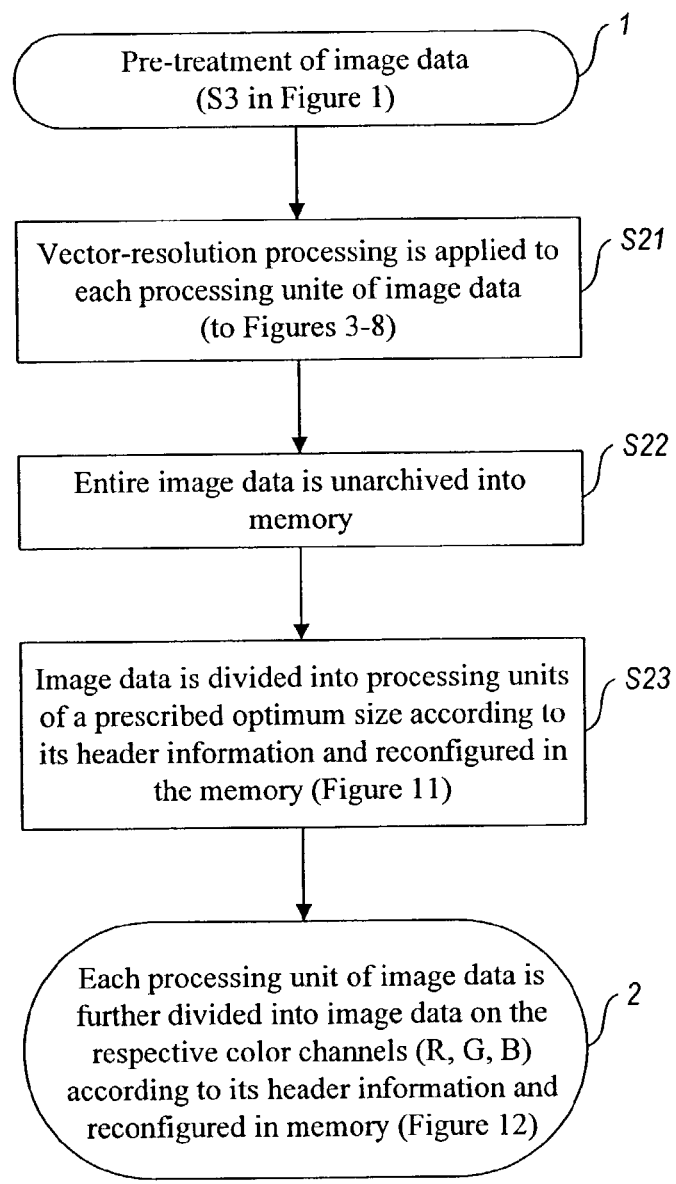
FIG. 2 is a flowchart showing the process of step 3 in FIG. 1 in which image data is divided into optimum processing units.

The processing computer applies pre-treatment to the image data input and stores it in memory (step S3). First, as shown in FIG. 2, all the image data is unarchived into memory (step S21). Next, after the information contained in the header label of the image data is interpreted, and the size (number of dots) of the entire image, structure of color channels, and the amount (number of bits) of luminance information allocated per pixel are confirmed, the image data is divided into optimum processing units of a predetermined image size according to the interpretation results, and the divided respective unit image data are reconstructed in the memory (step S22). Said optimum processing unit may be preset to a fixed image size, or it may be selected depending on the processing capability and memory capacity of the processing computer and the required image reproduction condition, such as image quality.

Figure 11:
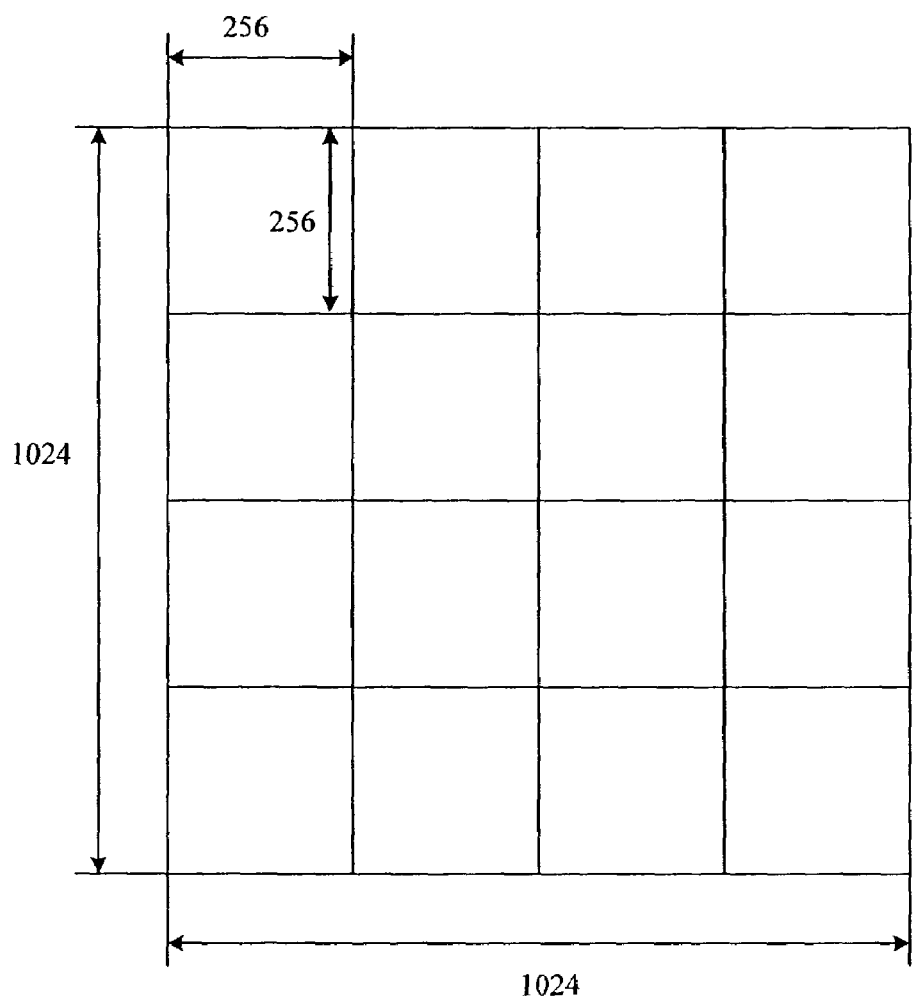
FIG. 11 is a diagram showing an example of the division of the image data.
Figure 12:
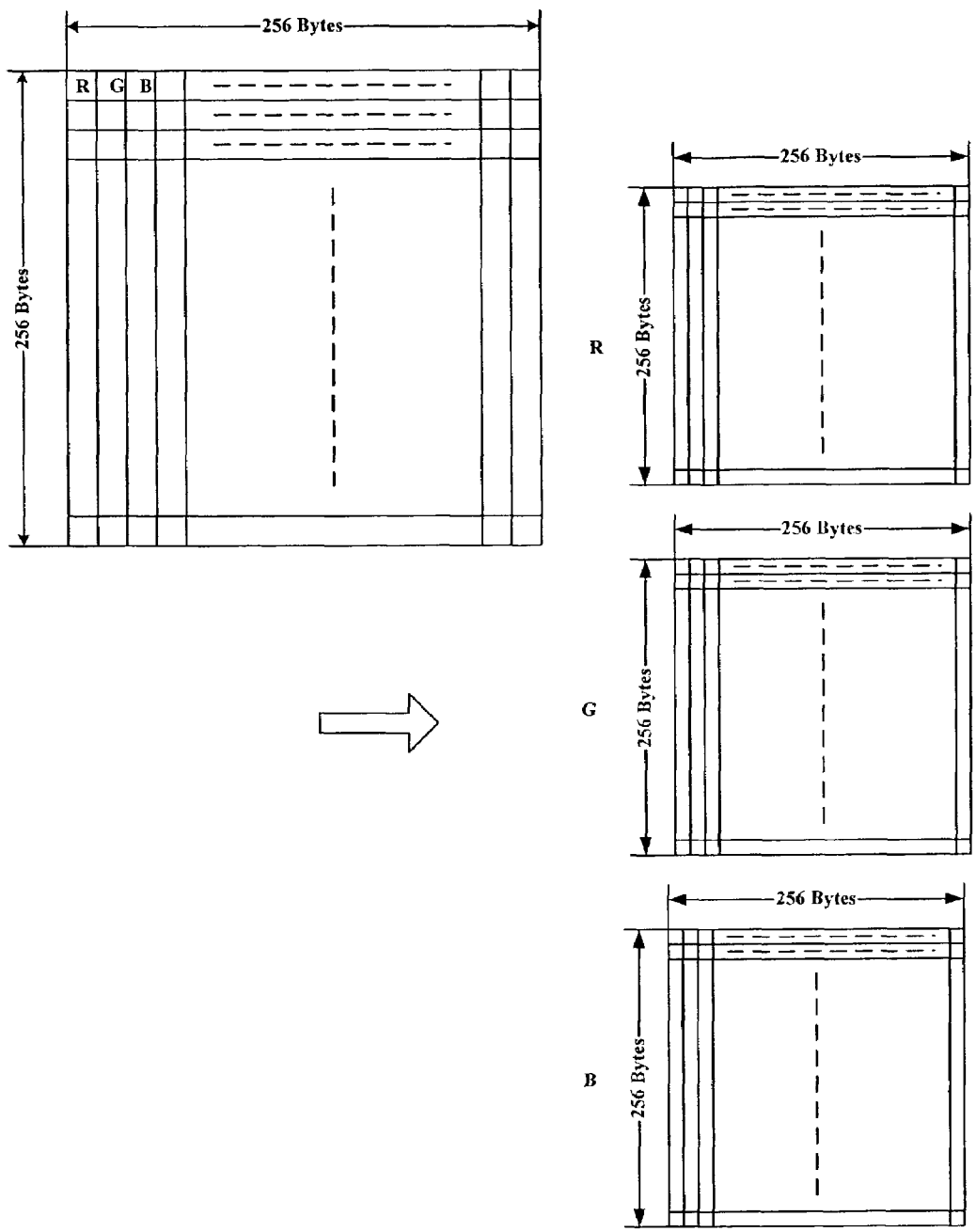
FIG. 12 is a diagram in which the image data divided in FIG. 11 are further divided into RGB color channels, respectively.

In the present application example, as shown in FIG. 11, compression processing is applied to RGB color image data at a resolution of 1024×1024 dots. Assuming that the optimum processing unit is 256×256 dots, the image data in FIG. 11 is divided into fourths in the vertical and horizontal directions and reconstructed into a total of 16 unit image data. Each pixel of said RGB unit image data contains a total of 3 bytes of information (luminance value) for the R, G, B color channels, respectively. Next, as shown in FIG. 12, said unit image data is divided into unit image data corresponding to the respective color channels (R, G, B) and reconstructed in memory (step S23). Unit image data on said respective color channels are used as a minimum processing unit for data compression processing. The unit image data on a single color channel contains 1 byte of information (luminance value) per pixel. Thus, the amount of data in the minimum processing unit is reduced to 256×256 bytes from 10242×32 required for processing the entire original image data.

Figure 3:
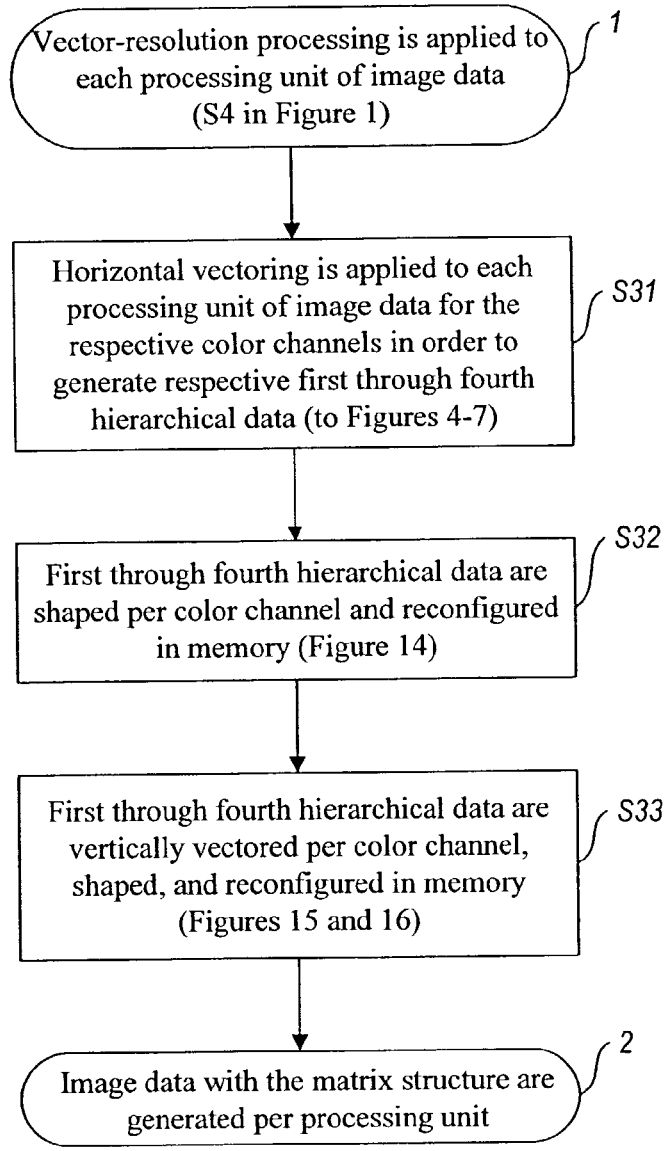
FIG. 3 is a flowchart showing the outline of the process in step 4 in FIG. 1 in which image data divided into optimum processing units are vectored in order to generate image data in matrix form.
Figure 4:
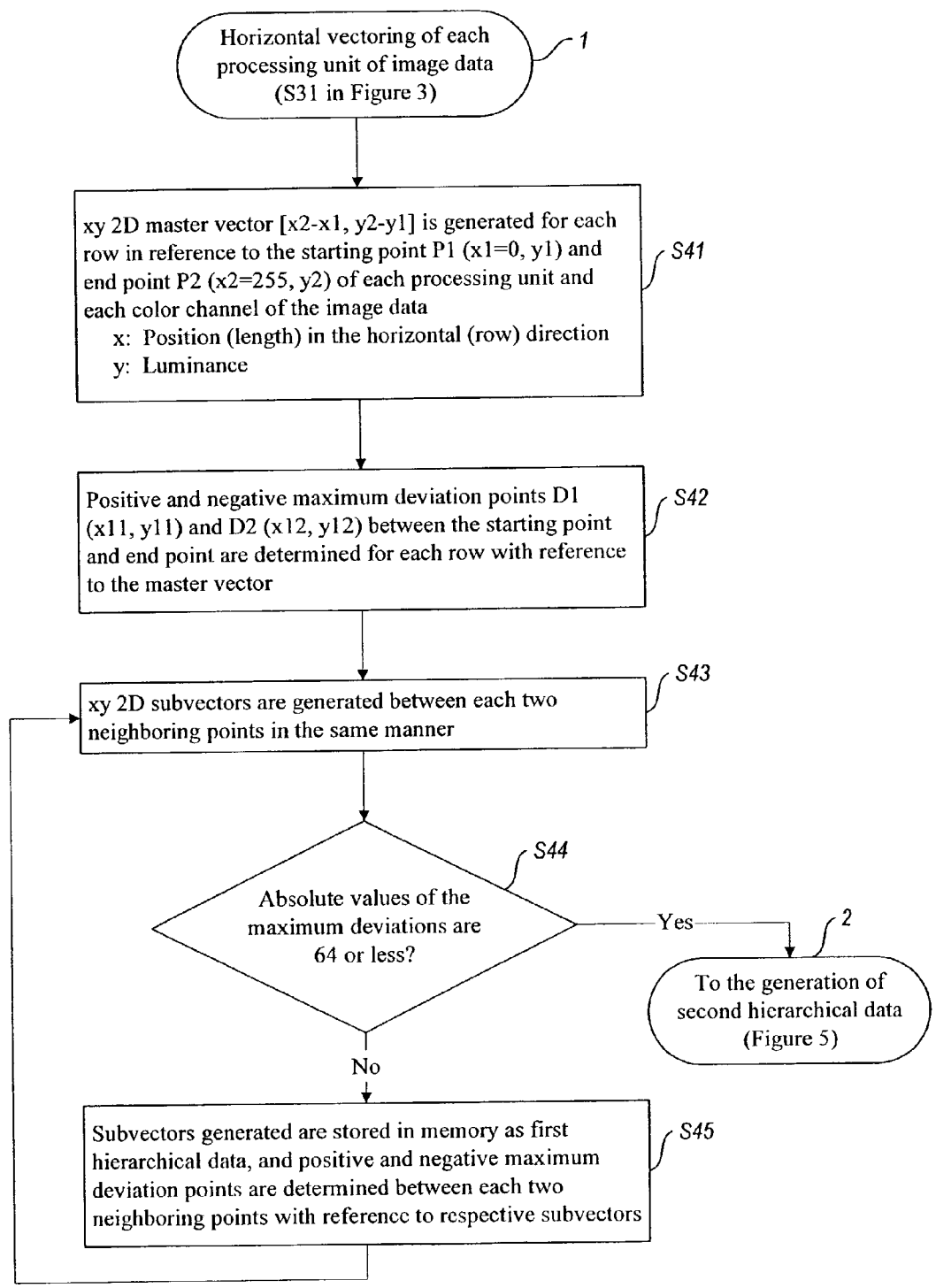
FIG. 4 is a flowchart showing the process in which image data is vectored in the horizontal direction in order to generate first hierarchical data.

Next, vector-resolution processing is applied in sequence to the unit image data on each single color channel within each optimum processing unit in order to generate image data converted into matrix form (step S4). As shown in FIG. 3, first, horizontal vectoring is applied row by row to the minimum processing unit image data on the respective color channels in sequence in order to generate first through fourth hierarchical data which are distinguished from one another by the amount (number of bits) of luminance information for the respective pixels (step S31).

Figure 13A:
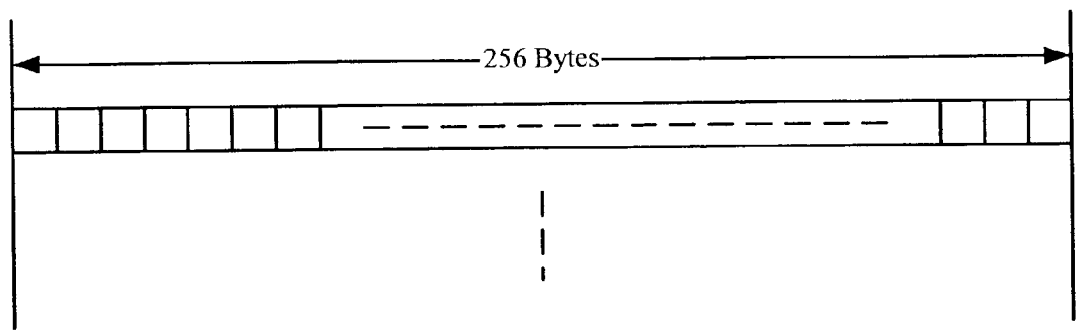
FIG. 13A is a diagram showing a horizontal row of image data on color channel R.
Figure 13B:
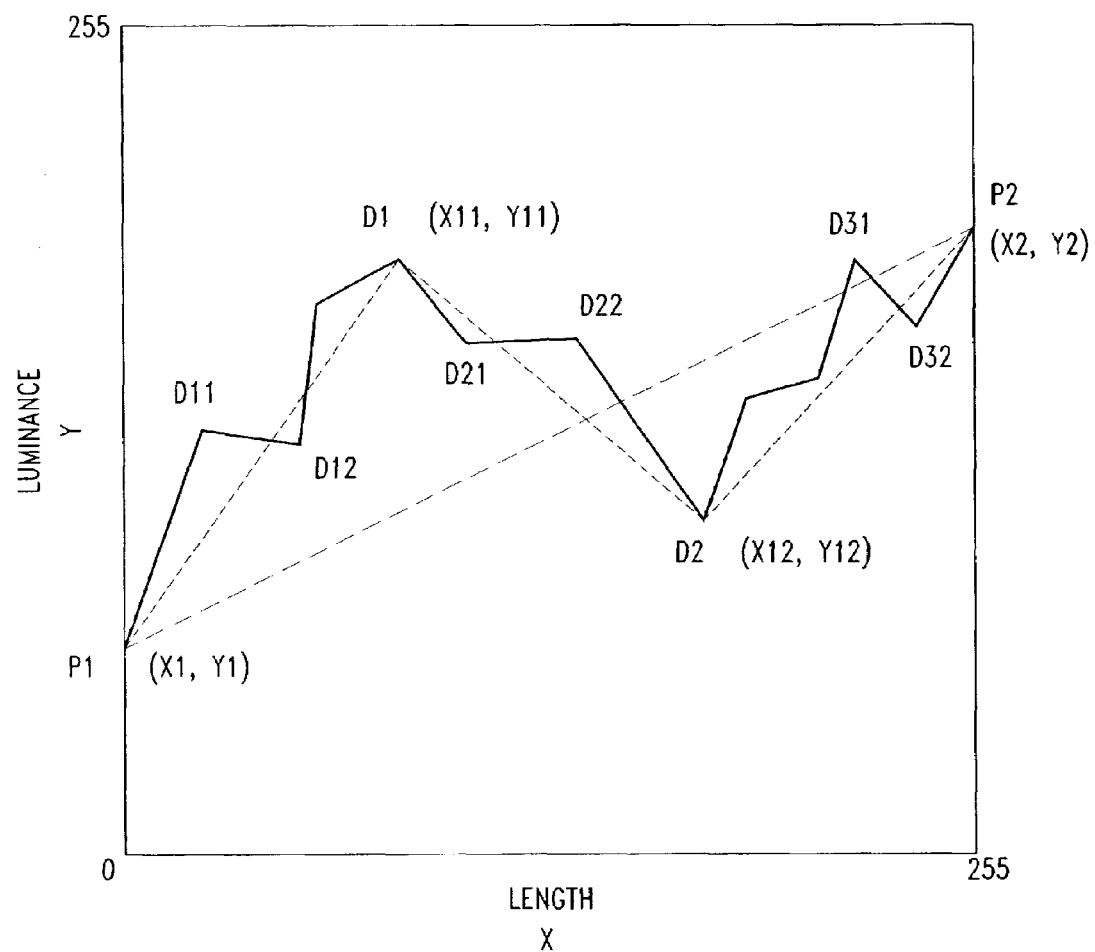
FIG. 13B is a linear diagram showing luminance levels relative to luminance distribution, that is, positions (lengths from the origin) of the pixels, for explaining the concept of vectoring.

Horizontal vectoring will be explained in detail using FIGS. 4 through 7. As shown in FIG. 13A, within the minimum processing unit image data, each horizontal row is configured with 256 contiguous pixels, and each pixel has a luminance value expressed using 1 byte of information. In FIG. 13B, positions of respective pixels within 1 horizontal row are expressed by means of length (0 through 255) along the horizontal axis, and luminance values of the respective pixels are expressed by means of 256 stages (0 through 255) along the vertical axis in order to show the luminance distribution of the pixels in 1 horizontal row. In the present invention, said distribution is replaced by a 2D vector having a length (x) and a luminance value (y) in order to express luminance information for the respective pixels, so that information on the luminance distribution and continuous changes in luminance can be kept when the image data is vectored.

More specifically, the first pixel in the first row is taken as starting point P1 (x1=0, y1), the last pixel is taken as the end point P2 (x2=255, y2), and the line element connecting them is taken as master vector P1P2=[x2−x1, y2−y1] (step S41). Next, luminance deviations of other pixels in the section between the starting point and the end point are calculated relative to the master vector in order to determine points D1 (x11, y11) and D2 (x12, y2) of positive and negative maximum deviation (step S42). Then, xy 2D subvectors P1D1=[x11−x1, y11−y1], D1D2=[x12−x11, y12−y11], and D2P2=[x2−x12, y2−y12] are generated, respectively, in the same manner between each two neighboring points, that is, P1 and D1, D1 and D2, and D2 and P2 (step S43). In addition, although there may be a case in which only one positive or negative deviation is present with reference to the master vector, that is, there is only one point which represents the maximum deviation, subvectors are generated in the same manner between each two neighboring points from respective line elements connecting them.

At this time, whether the absolute values of the deviations at the maximum deviation points (D1 and D2) are 64 or less [sic; less than 64], that is, whether the amount of information is 6 bits or less, is determined (step S44). If they are not 64 or less, that is, if they are greater than [64], the determination is made that said point (D1 or D2) contains information that should be expressed in 8 bits regarding the change in luminance relative to the starting point and the end point. On the other hand, if they are 64 or less, because the determination is made that said point (D1 or D2) contains information that should be expressed in 6 bits or less regarding the amount of change in luminance relative to the starting point and the end point, first hierarchy data generation process at the section between the starting point and the end point is ended, and advancement is then made to second hierarchy data generation process.

Figure 14A:
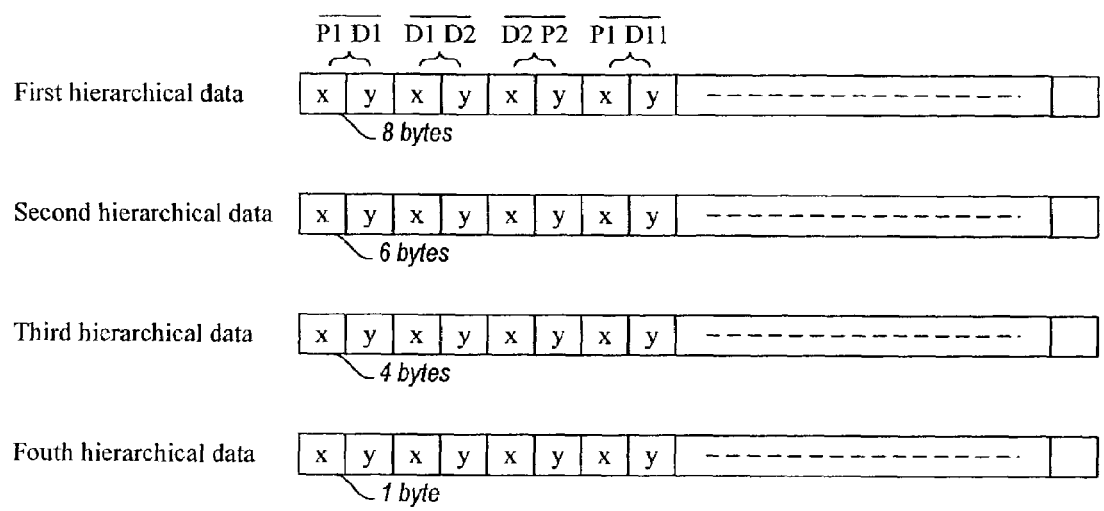
FIG. 14A is a diagram showing first through fourth hierarchical data generated from 1 horizontal row through vectoring.

If the absolute values of the maximum deviations are 64 or more, the aforementioned subvectors generated between each two neighboring points containing said points D1 and/or D2 are stored as first hierarchy data in memory (step S45). As shown in FIG. 14A, these subvectors are arranged in sequence using 2 values (x and y) each containing 8 bits of information as 1 data.

Furthermore, luminance deviations are calculated with reference to the respective subvectors for the respective sections between each two neighboring points, that is, P1 and D1, D1 and D2, and D2 and P2, in order to determine points D11, D12, D21, D22, D31, and D32 which assume positive and negative maximum deviations. Next, steps S43 through S45 carried out for the first maximum deviation points (D1 and D2) are repeated for all of these newly determined maximum deviation points until the absolute values of those maximum deviations become 64 or less.

In other words, xy 2D subvectors, such as P1D11, D11D12, and D12D1, are generated in the same manner between each two neighboring points at the respective 2 points which constitute the new maximum deviation points (D11, D12, D21, D22, D31, and D32) and their reference subvectors (step S43). Then, whether the absolute values of the maximum deviations are 64 or less is determined (step S44), wherein, if they are 64 or less, the first hierarchy data generation process is ended for said sections, and advancement is then made to the second hierarchy data generation process. If they are greater than 64, the newly generated subvectors are added in the same manner to the first hierarchy data using 2 values (x and y). In this manner, the first hierarchy data shown in FIG. 14A is generated in the memory.

Figure 5:
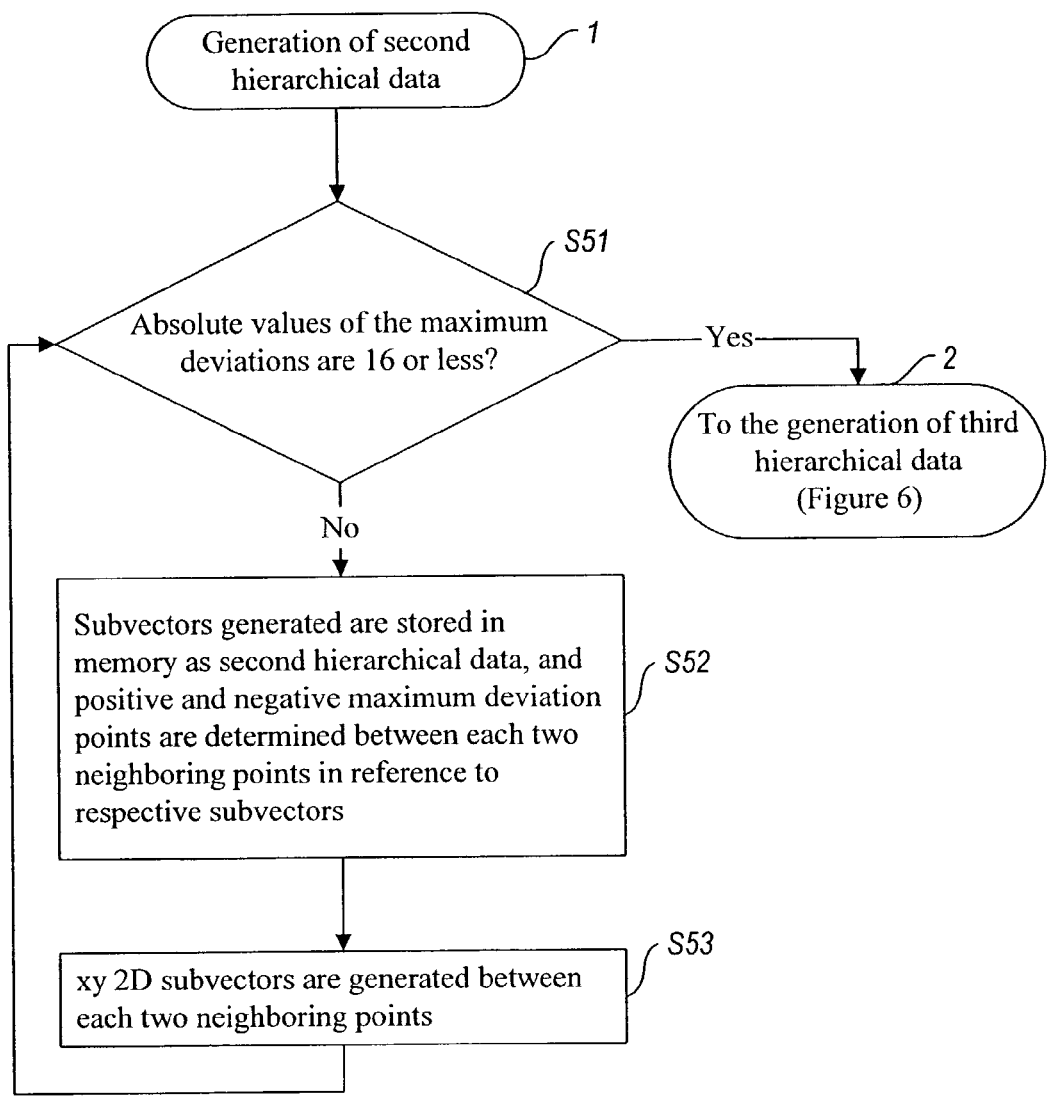
FIG. 5 is a flowchart showing the process in which image data is vectored in the horizontal direction in order to generate second hierarchical data.

During the second hierarchy data generation process, as shown in FIG. 5, whether or not the absolute values of the maximum deviations relative to the reference vectors are 16 or less is determined with respect to the points where the maximum deviations have been judged to be 64 or less in step S44 of the first hierarchy data generation process (step S51). If they are not 16 or less, that is, if they are greater than said value, the determination is made that said points contain information regarding the amount of change in luminance relative to the reference subvectors that should be expressed in 6 bits. On the other hand, if they are 16 or less, because the determination is made that said points contain information regarding the change in luminance relative to the reference subvectors that should be expressed in 4 bits or less, the second hierarchy data generation process is ended, and advancement is then made to the third hierarchy data generation process.

If the absolute values of the maximum deviations are greater than 16, the subvectors generated between each two neighboring points containing said points in step S43 of the first hierarchy data generation process are stored in memory as second hierarchical data (step S52). As shown in FIG. 14A, these subvectors are arranged successively using 2 values (x and y) each containing 6 bits of information as 1 data. Furthermore, luminance deviations are calculated with reference to the respective subvectors for the respective sections between each two neighboring points in order to determine points which assume positive and negative maximum deviations.

Next, at all of the newly determined maximum deviation points and the respective 2 points constituting their reference subvectors, xy 2D subvectors are generated in the same manner between each two neighboring points (step S53). Then, whether the absolute values of the maximum deviations at the new deviation points are 16 or less is determined (step S51); wherein, if they are 16 or greater, the newly generated subvectors are added to the second hierarchy data using 2 values (x and y).

Steps S51 through S53 are repeated until the absolute values of the maximum deviations of all the newly determined deviation points are less than 16. Subvectors which are determined to be greater than 16 are added sequentially as second hierarchy data, and the second hierarchy data shown in FIG. 14A is stored in memory.

Figure 6:
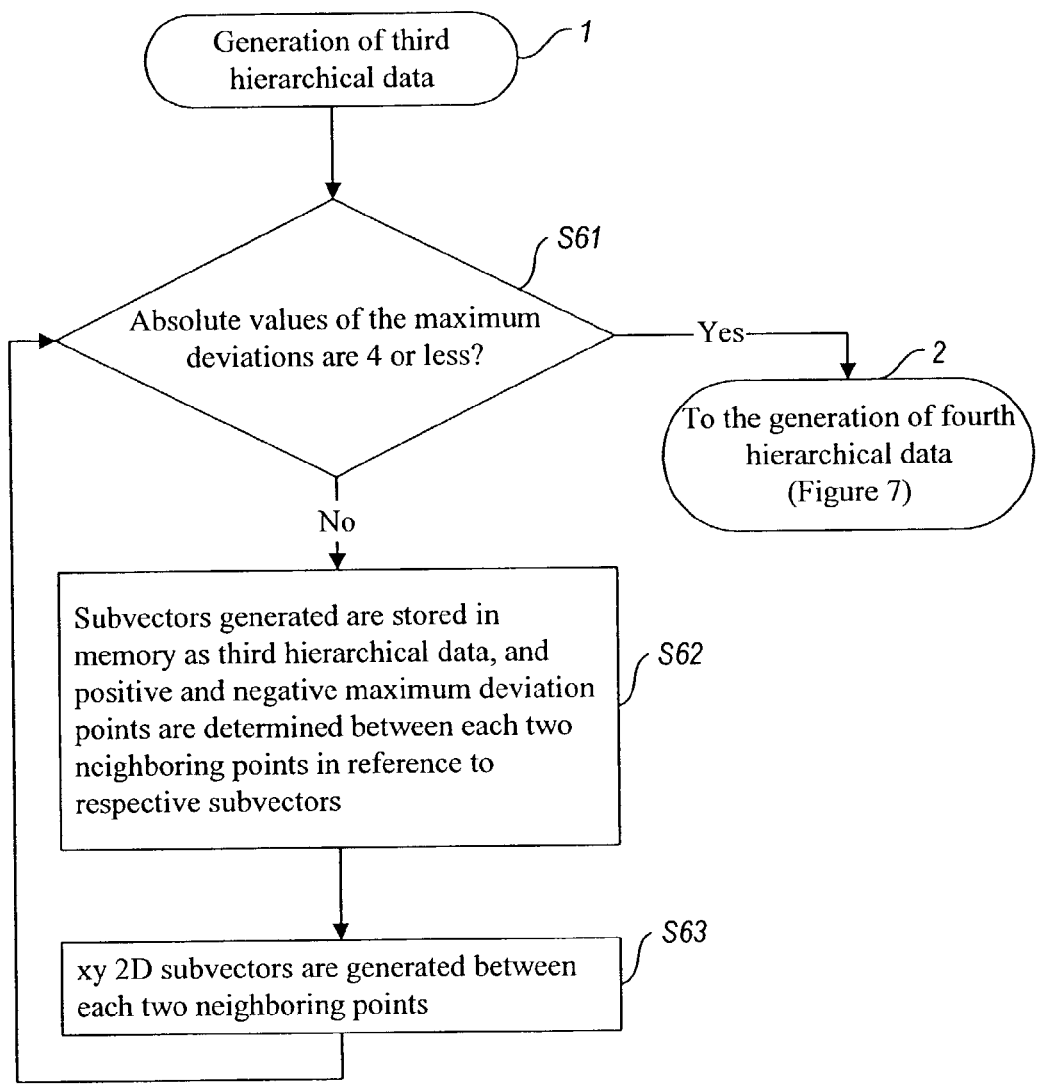
FIG. 6 is a flowchart showing the process in which image data is vectored in the horizontal direction in order to generate third hierarchical data.

As shown in FIG. 6, the third hierarchical data generation process is carried out in the same manner as the generation process of the second hierarchy data. That is, whether or not the absolute values of the maximum deviations relative to their reference vectors are 4 or less is determined with respect to the points where the maximum deviations have been determined to be less than 16 in step S51 of the second hierarchy data generation process (step S61). If they are not 4 or less, that is, they are greater than said value, the determination is made that they contain information regarding the change in luminance relative to the reference subvectors that should be expressed in 4 bits. On the other hand, if they are 4 or less, because the determination is made that they contain information regarding the change in luminance relative to the reference subvectors that should be expressed in 2 bits or less, the third hierarchy data generation process is ended, and advancement is then made to the fourth hierarchy data generation process.

If the absolute values of the maximum deviations are greater than 4, the subvectors generated between each two neighboring points containing their maximum deviation points in step S53 of the second hierarchy data generation process are stored in memory as third hierarchy data (step S62). These subvectors are arranged successively using 2 values (x and y) each containing 4 bits of information as 1 data, as shown in FIG. 14A. Furthermore, luminance deviations are calculated with reference to respective subvectors at respective sections connecting each two neighboring points in order to determine positive and negative maximum deviation points.

Next, at all of the newly determined maximum deviation points and the respective 2 points constituting their reference subvectors, xy 2D subvectors are generated in the same manner between each two neighboring points (step S63). Then, whether or not the absolute values of the maximum deviations at the new deviation points are 4 or less is determined (step S61), wherein, if they are 4 or more, the newly generated subvectors are added to the third hierarchy data using 2 values (x and y).

Similarly, steps S61 through S63 are repeated until the absolute values of the maximum deviations of all the newly determined deviation points are less than 4. Subvectors which are determined to be greater than 4 are added sequentially as third hierarchy data, and the third hierarchy data shown in FIG. 14A is stored in memory.

Figure 7:
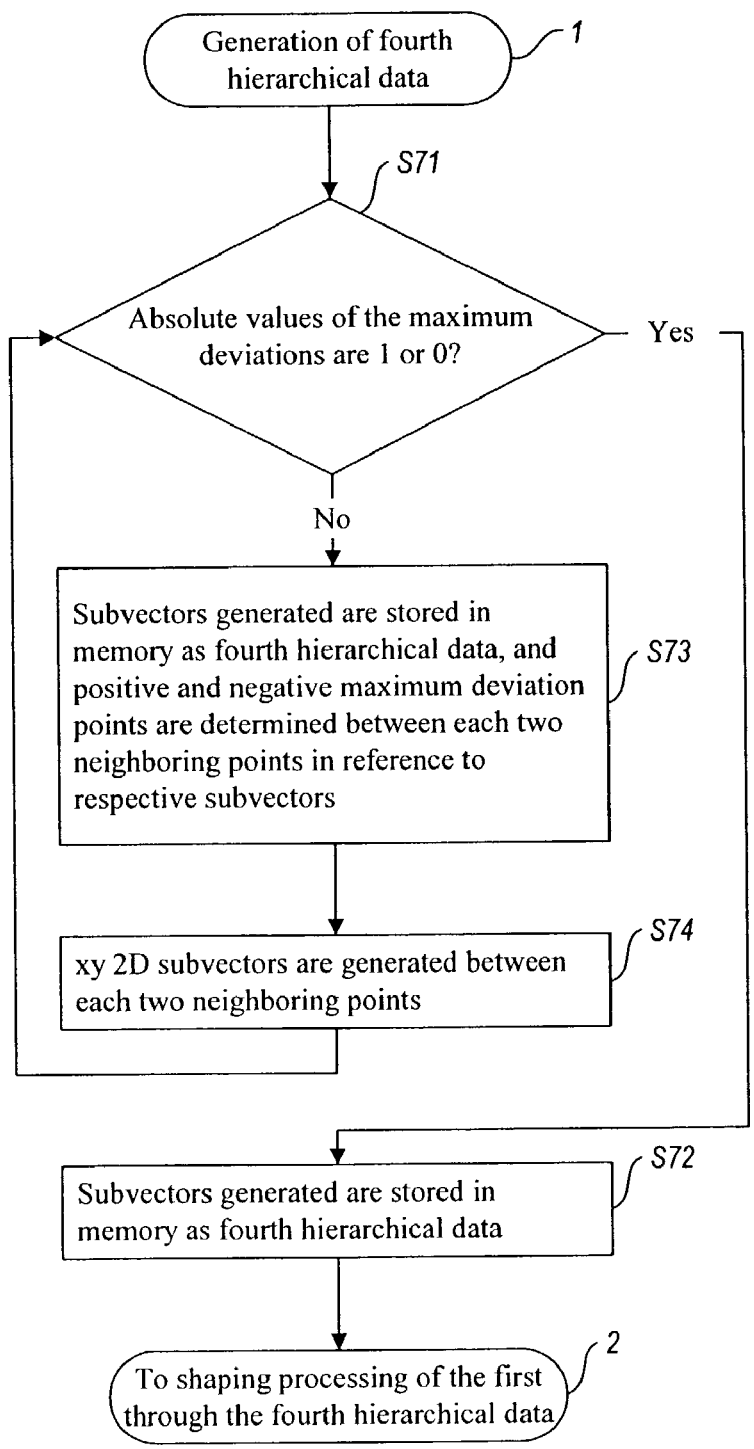
FIG. 7 is a flowchart showing the process in which image data is vectored in the horizontal direction in order to generate fourth hierarchical data.

During the fourth hierarchy data generation process, as shown in FIG. 7, whether the absolute values of the maximum deviations relative to their reference vectors are 1 or 0 is determined with respect to the points where the maximum deviations have been determined to be less than 4 in step S61 of the third hierarchy data generation process (step S71). If they are 1 or 0, because the determination is made that said points contain information regarding the change in luminance relative to the reference subvectors that should be expressed with 1 bit, subvectors generated between each two neighboring points containing said points are also stored as fourth hierarchy data using 2 values (x and y) as shown in FIG. 14A (step S72).

If the absolute values of the maximum deviations are not 1 or 0, the determination is made that said points contain information greater than 1 bit regarding the change in luminance relative to the reference subvectors. In this case, luminance deviations are further calculated with reference to the subvectors generated between each two neighboring points containing the maximum deviation points in step S63 of the third hierarchy data generation process in order to determine points of positive and negative maximum deviation (step S73). Then, xy 2D subvectors are generated between each two neighboring points at the respective points constituting the newly determined maximum deviation points and their reference subvectors (step S74), and whether or not the absolute values of said maximum deviations are 1 or 0 is determined (step S71).

The determination is made that all of the maximum deviation points generated in said manner contain information regarding the change in luminance relative to their subvectors that should be expressed with 1 bit, and the steps S71, 73, and 74 are repeated until fourth hierarchy data is stored in memory. Accordingly, the data at the remaining points after the generation of the third hierarchy data are all converted into vectors each having 2 values (x and y) and generated into fourth hierarchy data.

In this manner, vector-resolution processing is applied to changes in luminance of the respective pixels in the respective rows of the minimum processing unit image data in order to generate the first through fourth hierarchy data with different numbers of bits according to size and to arrange them in memory in the order of first to 256th row. At this time, information on the starting points (P1) and the end points (P2) in the original image data, that is, length in the horizontal direction and luminance values, is placed in the leading parts of the respective rows. In addition, data indicating the boundaries between the respective hierarchy data are inserted between them.

In the aforementioned process, in which post-treatment is applied to the minimum processing unit image data in the horizontal direction, and the first through fourth hierarchy data are generated, because the respective rows of the image data divided into the minimum processing units are further processed independently, the data size subjected to 1 set of processing is small. In addition, because the original data is no longer needed once said data is reconstructed after it is unarchived into certain areas in the memory and processed, those areas can be freed for subsequent processing. Thus, in the present invention, memory of the processing computer can be utilized more effectively than heretofore. Moreover, because the respective rows in the horizontal direction can be processed in parallel simultaneously or with some delay depending on the processing capability, the processing speed can be significantly improved. In addition, image data for large format can be processed even with a processing computer with a relatively low capacity.

Needless to say, the data lengths of the first through fourth hierarchy data are different for the respective rows. Thus, in the present application example, one with the longest data length is selected from the entire rows for the respective hierarchy data, and it is used as reference data length, wherein, if the data length is longer than said reference data length, value "0" is entered into respective insufficient data length areas shaded in FIG. 14B. Accordingly, the minimum processing unit image data is formed in such a way that the respective hierarchy data have the same data length from the first to the 256th row, that is, the respective rows in the vertical direction are configured with the same 256 continuous data, before it is reconfigured in memory (step S32).

Figure 8:
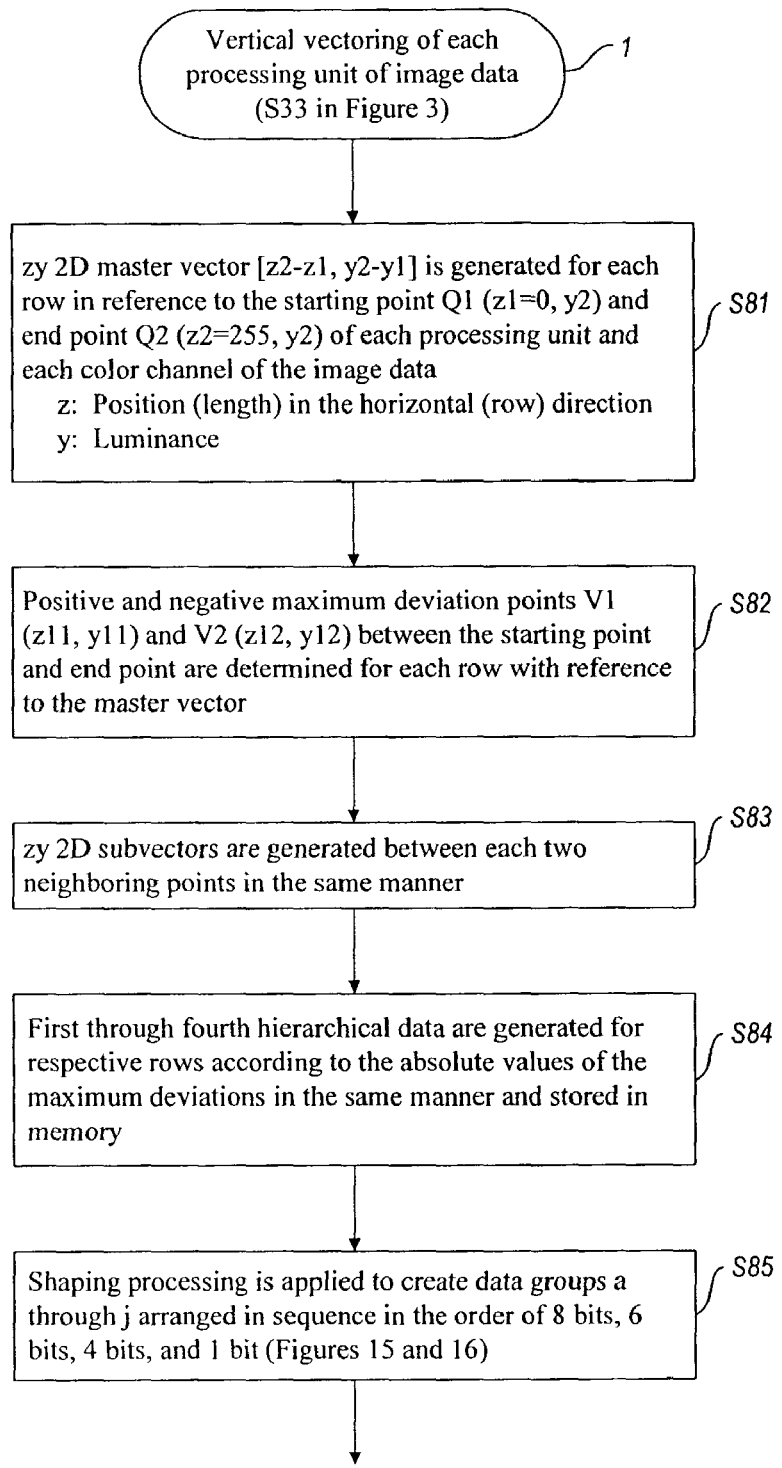
FIG. 8 is a flowchart showing the outline of the process in which vertical vectoring is applied to the horizontally vectored image data after processing.
Figure 9:
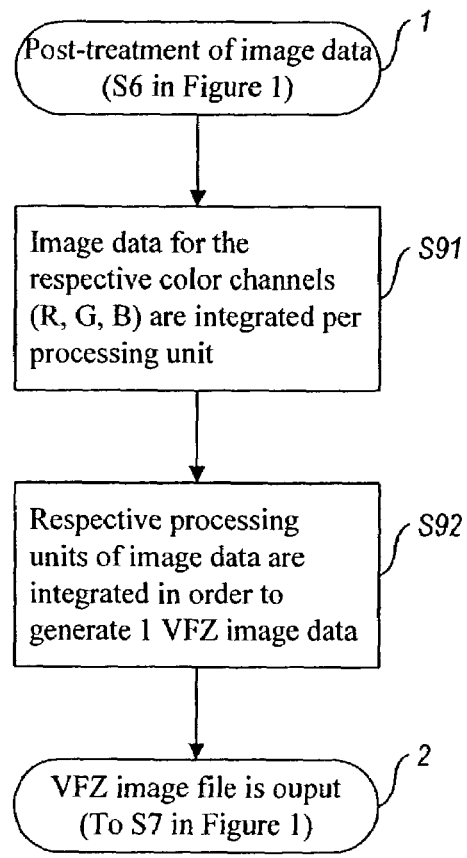
FIG. 9 is a flowchart showing the process in which post-treatment is applied to the image data vectored in the horizontal and vertical directions in order to generate a VFZ image file of the present invention.
Figure 10:
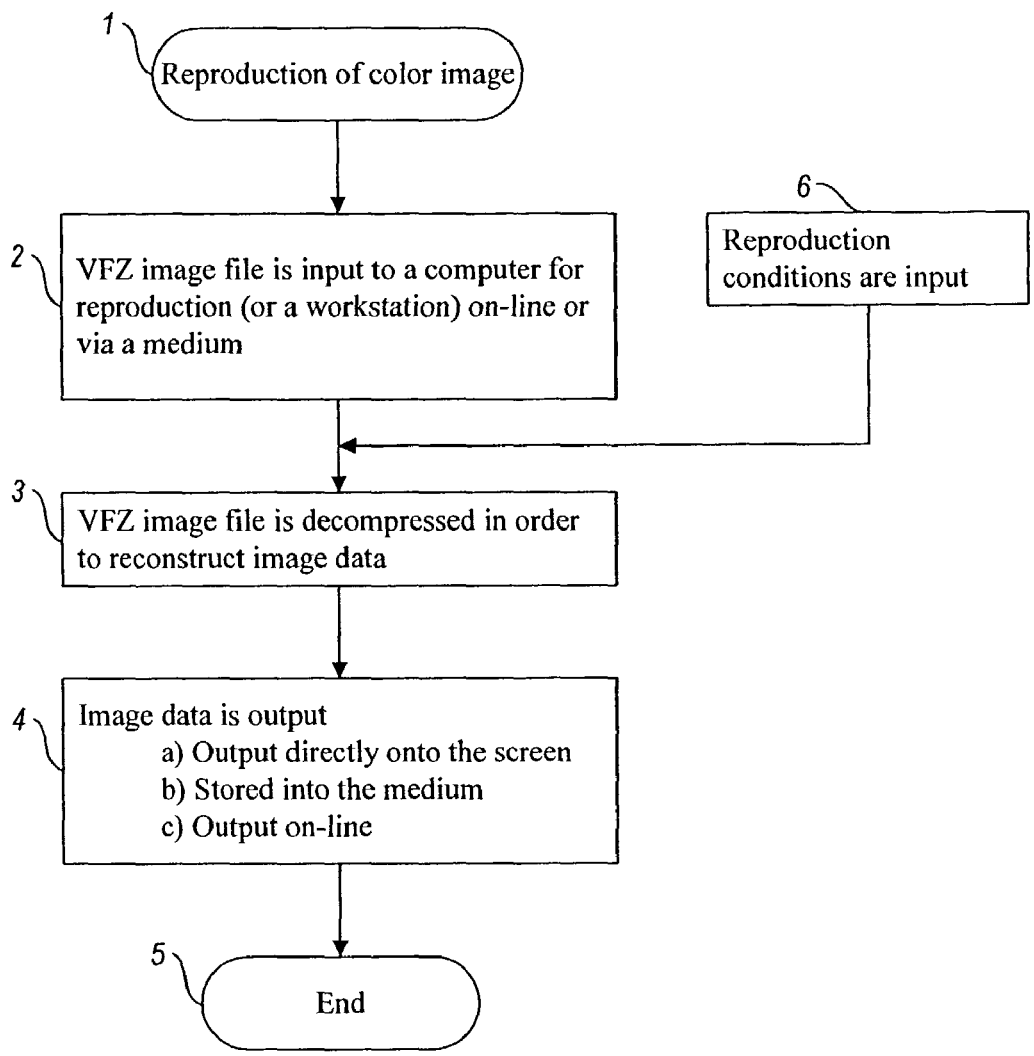
FIG. 10 is a flowchart showing the process in which the generated VFZ image file of the present invention is reproduced.
Figure 14B:
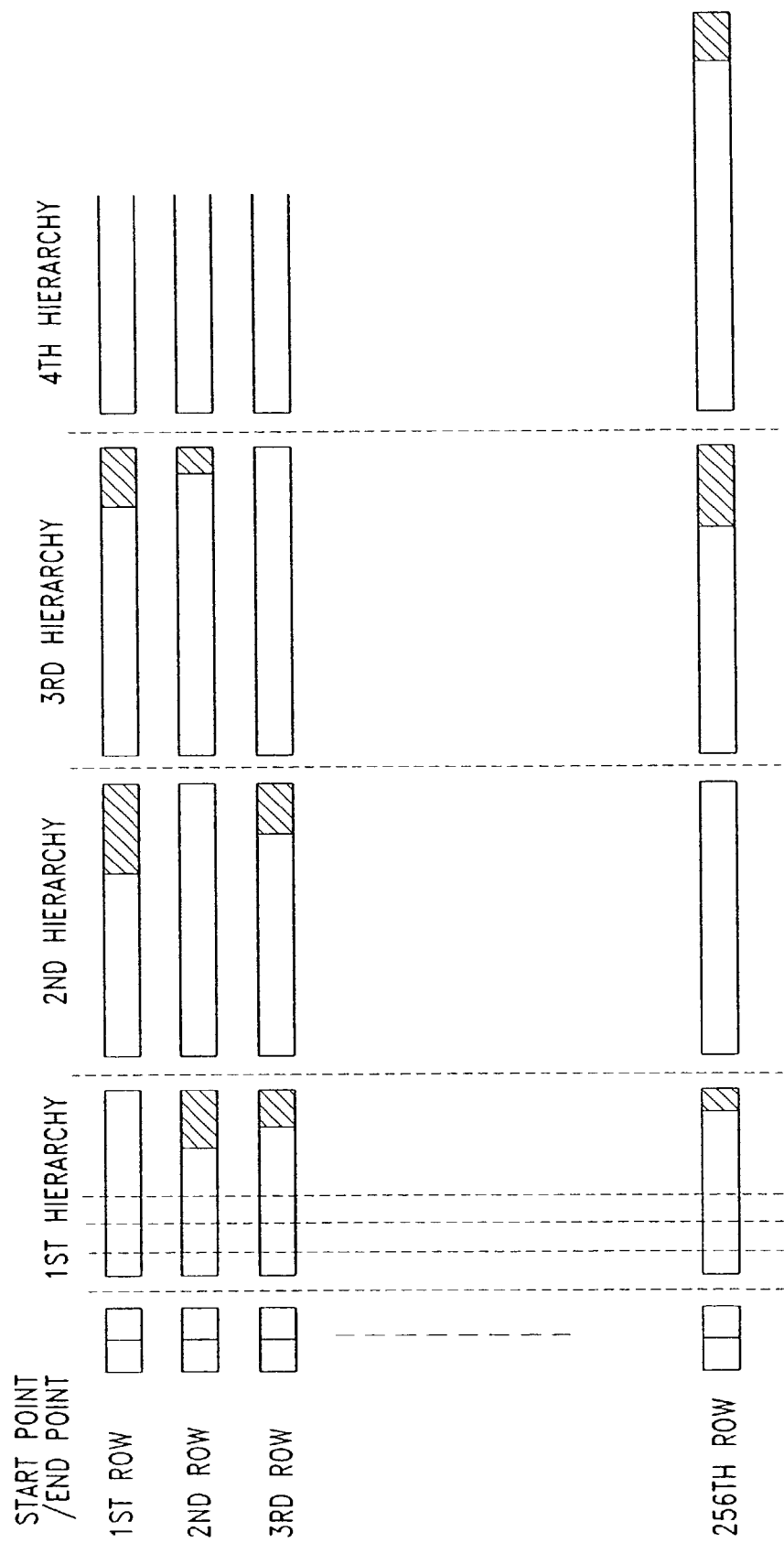
FIG. 14B is a diagram showing the condition in which shaping processing is applied to the horizontally vectored image data in all rows.

Next, the horizontally vectored image data in FIG. 14B are vectored in sequence for the respective rows in the vertical direction (step S33). Respective rows are vectored in the same way as for the aforementioned horizontal vectoring according to the process shown in FIG. 8 in order to generate the first through fourth hierarchy data for the respective rows. First, a master vector Q1Q2=[z2–z1, y2–y1] is generated with respect to the leading first row with reference to its starting point Q1 (z1=0, y1) and end point Q2 (z2=255, y2) (step S81).

Next, in the section connecting the aforementioned starting point and the end point, luminance deviations of other pixels are calculated with reference to the master vector in order to determine points V1 (z11, y11) and V2 (z12, y12) of positive and/or negative maximum deviations (step S82). Then, zy 2D subvectors Q1V1=[z11–z1, y11–y1], V1V2=[z12–z11, y12–y11], and V2Q2=[z2–z12, y2–y12] are generated between each two neighboring points, that is, Q1 and V1, V1 and V2, and V2 and Q2, in the same manner (step S83). Here, y1, y2, y11, and y12 used for the respective points Q1, Q2, V1, and V2 are different from y1, y2, y11, and y12 for the respective points P1, P2, D1, and D2 used for the horizontal vectoring.

As in the process described above in connection with FIG. 4 during the horizontal vectoring, whether or not the absolute values of the deviations at the maximum deviation points V1 and V2 are 64 or less is decided; wherein, if they are greater than 64, subvectors, each containing 8 bits of information and expressed using 2 values (z and y), are stored in memory as first hierarchy data. Then, new positive and negative maximum deviation points are further determined with reference to said subvectors, and are added to memory as long as the absolute values of said deviations exceed 64 in order to generate first hierarchical data.

When the absolute values of the maximum deviations all become 64 or less at the newly determined maximum deviation points, advancement is made to the second hierarchy data generation process in the same manner, and vectoring is applied according to the same process described above in connection with FIG. 5 in order to generate second hierarchy data configured only with data having 6 bits of information to be stored in memory. Next, after vectoring is applied in the same manner as that described above in connection with FIG. 6 in order to generate third hierarchy data configured only with data having 4 bits of information to be stored in memory, fourth hierarchy data configured only with data having 1 bit of information is generated and stored in memory through the same vector processing as that described above in connection with FIG. 7 (step S84).

During said vertical vectoring, too, as described above in connection with the horizontal vectoring, because the respective steps for generating the first through fourth hierarchy data are carried out independently for small size data, the original memory areas for the reconstructed data can be freed in sequence for subsequent processing, so that effective utilization of the memory can be achieved, and the processing speed can be improved significantly through parallel processing of the respective rows, either concurrently or with delays. In addition, even relatively large amounts of image data can be processed using a processing computer of relatively low capacity.

Figure 15:
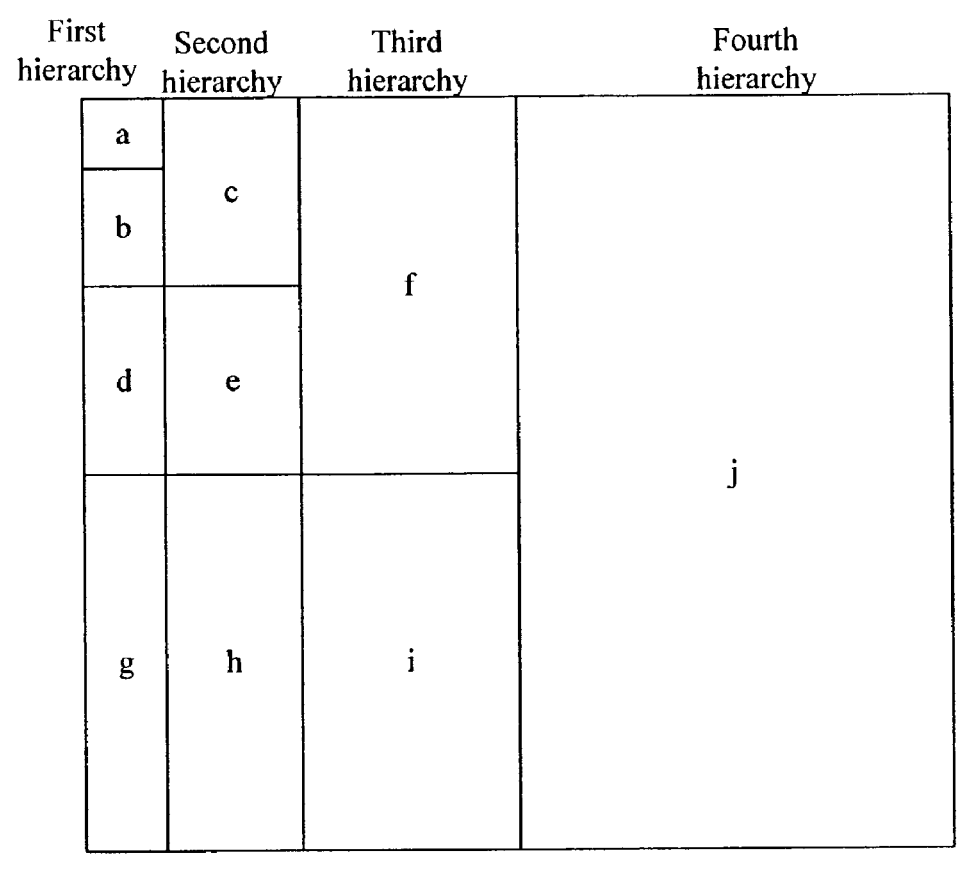

As shown in FIG. 14B, because the starting point, end point, and the divisions of the first through fourth hierarchy data are already obtained for the image data subjected to the vertical vector-resolution processing, while the first through fourth hierarchy data are all generated from the starting point, the end point, and the first hierarchy data; only the second through the fourth hierarchy data are generated from the second hierarchy data; only the third and the fourth hierarchy data are generated from the third hierarchy data; and only the fourth hierarchy data is generated from the fourth hierarchy data. In fact, the present inventor applied the image compression processing of the present application example to several full-color test images and confirmed that the first through fourth hierarchy data resulted in fixed proportions represented approximately by area a, area b+c, area d+e+f, and area g+h+i+j shown in FIG. 15.

Figure 16:
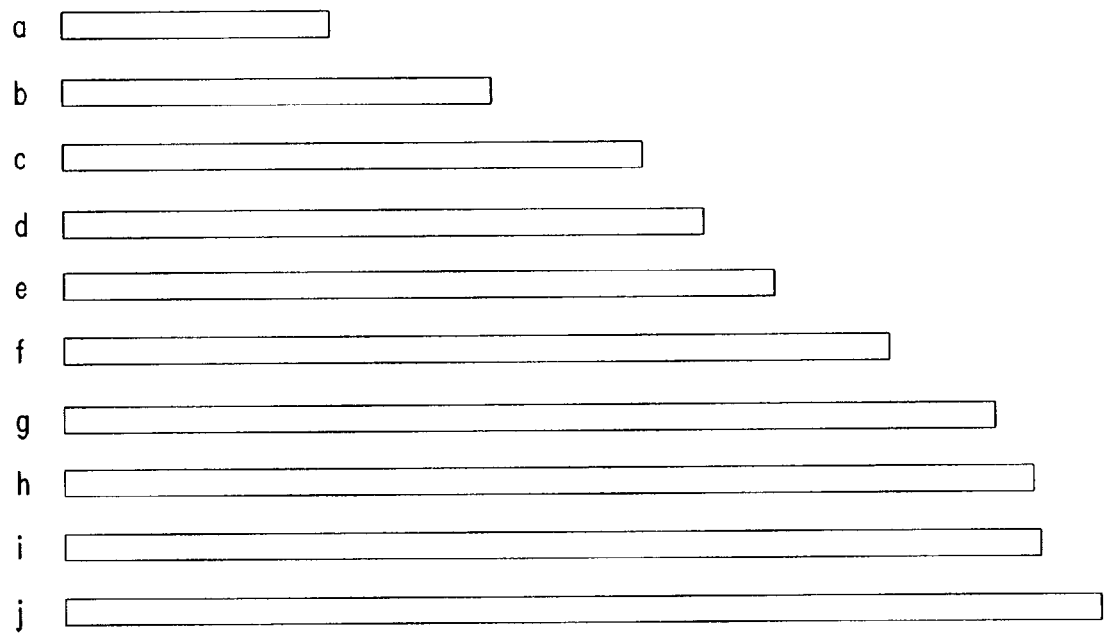
FIG. 16 is a diagram showing the arrangement of the image data vectored in the horizontal and vertical directions.

Next, shaping is applied in order to arrange these data groups (a through j) in the order of first through fourth hierarchy data shown in FIG. 16, that is, according to bit size, for reconfiguration in the memory (step S85). Thus, compressed image data with the desired matrix form can be obtained from the minimum processing unit, that is, unit image data with a single channel (step S4).

In the present invention, luminance data for the respective pixels are vectored in this manner, and the data are hierarchized and reconfigured according to their significance levels; wherein, luminance information for pixels with no essential significance can be absorbed into 1 vector. Therefore, when hierarchized simply in this manner, the amount of data can be reduced without essentially losing the information contained in the original file. Particularly, the most efficient data structure can be created during the compression of superfine image data with a large amount of information. In addition, because the hierarchies are achieved by dividing the data with reference to a fixed number of bits during the processing in which the image data applied with 2D vectoring in the horizontal and the vertical directions are hierarchized and reconfigured, the processing may be referred to as quantization.

Said image data is compressed using a technique of the prior art (step S5). Compression processing is applied to the first through fourth hierarchy data, respectively, using a mathematical compression method for which known runlength compression processing and Huffman compression processing are combined, for example. Accordingly, the compressed data in accordance with the present invention is generated per single-channel unit image data. In the present invention, because the image data is hierarchized in this manner, improved mathematical compression relative to that of conventional compression techniques can be realized. Furthermore, because mathematical compression is applied in addition to the hierarchization of the image data, despite the fact that the image data can be compressed at a high compression rate, no essential image data is lost.

Vector-resolution processing is also applied to the other two color channels which constitute the same optimum processing unit image data in order to convert them into image data having the aforementioned matrix form, and compression processing is also applied in order to generate compressed image data in accordance with the present invention.

Next, in step S6, the compressed image data generated individually for the 3 color channels in said manner are integrated in order to generate optimum processing unit RGB compressed image data and stores it in memory (step S91). Once compressed image data for the 16 units of image data are all generated, they are integrated in order to generate a VFZ image file of the present invention representing the compressed version of the entire original image data (step S92). In this case, a header label indicating the file size and data structure is inserted to the leading part of the VFZ image file.

To reproduce the original color image, the VFZ image file is output on-line from the processing computer or using a storage medium, such as a CD-R, to a computer for reproduction or a workstation via an ordinary network (step S7). Reproduction conditions, such as output resolution and image size, are input to the computer for reproduction. The VFZ image file is decompressed, and image data with the aforementioned matrix structure is generated based on the aforementioned reproduction conditions. The image data is output directly onto the screen of a prescribed display device from the reproducing computer, or it is stored into a storage device, such as a server, prior to its on-line transfer.

Because the image data output has the aforementioned matrix structure described in connection with FIG. 16, the entire image is displayed on the screen at the point when the first hierarchical data output in advance is input, finer images are displayed as the second and subsequent hierarchical data are input, and the original superfine color image is reproduced at the end as the entire data are input.

Although a case involving the compression of RGB system image data was explained in the aforementioned application example, the present invention can also be applied to a color image utilizing CMY system or other formats as well as image data having a monochromatic channel, such as gray scale, in the same manner. In addition, as it is clear to an expert in the field, the present invention may also be implemented with additions of a variety of changes and modifications to the aforementioned application example without exceeding its technological scope.

The invention claimed is:

1. An image compression method comprising:
   producing a 2D-vectored data pattern according to the positions and luminance levels of respective pixels in respective horizontal rows of digital image data;
   quantizing the data according to the change in the luminance levels with reference to the line elements connecting the starting points and the end points of said respective rows;
   data from respective vertical rows of said horizontally vectored and quantized image data;
   producing 2D-vectored according to the positions and luminance levels of the respective pixels according to the degrees of change in the luminance levels with reference to the line elements connecting the starting points and the end points of the respective vertical rows,
   converting the image data into compressed image data in matrix form based on the significance levels of the luminance information of the respective pixels.

2. The image compression method of claim 1, further comprising:
   dividing said bitmap digital image data into unit image data of a prescribed size;
   applying horizontal vectoring and quantization and subsequent vertical vectoring and quantization to the divided unit image data in order to convert them into unit compressed image data in matrix form; and
   integrated the unit compressed image data.

3. The image compression method according to claim 1, further comprising:
   dividing the digital image data into respective color channels;
   converting the divided image data for the respective color channels into respective compressed image data in matrix form; and
   integrating said compressed image data in matrix form into one compressed image.

4. The image compression method of claim 1, further including:
   applying a mathematical compression to said compressed image data in matrix form.

5. The image compression method of claim 1, further including:
   using line elements connecting the starting points and the end points of the respective vertical row or the respective horizontal rows as reference vectors for calculating positive and/or negative maximum deviation points in said units, using line elements connecting each two neighboring points at said starting points, the end points, and said maximum deviation points as new reference vectors for calculating new positive and/or negative maximum deviation points in said units in order to calculate said maximum deviation points; repeating the using steps until the deviations of said respective maximum points with respect to the reference vectors lose their significance as desired image data, and respective pixels are divided according to the degree of deviation at said respective maximum deviation points in order to generate multiple hierarchical data containing different numbers of bits.

6. The image compression method of claim 5 wherein when said digital image data is 8-bit data, said multiple hierarchical data are constructed as four groups organized as first through fourth hierarchical data comprising 8 bits, 6 bits, 4 bits, and 1 bit, respectively.

* * * * *